US008788611B2

(12) United States Patent
Camble et al.

(10) Patent No.: US 8,788,611 B2
(45) Date of Patent: Jul. 22, 2014

(54) METHOD FOR USING PARTITIONING TO PROVIDE CAPACITY ON DEMAND IN DATA LIBRARIES

(75) Inventors: Peter Thomas Camble, Bristol (GB); Jeff J Kato, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1507 days.

(21) Appl. No.: 10/033,003

(22) Filed: Dec. 28, 2001

(65) Prior Publication Data

US 2003/0135580 A1    Jul. 17, 2003

(51) Int. Cl.
G06F 15/167 (2006.01)
G06F 15/173 (2006.01)
G06F 15/16 (2006.01)

(52) U.S. Cl.
USPC ............................ 709/216; 709/225; 709/229

(58) Field of Classification Search
USPC ......... 709/213, 215, 223–226, 216–217, 229; 711/100, 130; 707/964–968
See application file for complete search history.

(56) References Cited

U.S. PATENT DOCUMENTS

| | | |
|---|---|---|
| 5,070,404 A | 12/1991 | Bullock et al. |
| 5,164,909 A | 11/1992 | Leonhardt |
| 5,286,954 A | 2/1994 | Sato |
| 5,303,214 A | 4/1994 | Kulakowski et al. |
| 5,367,669 A | 11/1994 | Holland et al. |
| 5,396,558 A | 3/1995 | Ishiguro |
| 5,416,914 A | 5/1995 | Korngiebel |
| 5,425,102 A | 6/1995 | Moy |
| 5,442,771 A * | 8/1995 | Filepp et al. ................... 709/219 |
| 5,455,409 A | 10/1995 | Smith et al. |
| 5,564,040 A * | 10/1996 | Kubala .......................... 711/173 |
| 5,613,154 A | 3/1997 | Burke et al. |
| 5,615,345 A | 3/1997 | Wanger |
| 5,734,859 A | 3/1998 | Yorimitsu et al. |
| 5,802,278 A | 9/1998 | Isfeld et al. |
| 5,805,864 A | 9/1998 | Carlson |
| 5,819,309 A | 10/1998 | Gray |
| 5,835,015 A | 11/1998 | Ikeda |
| 5,835,940 A | 11/1998 | Yorimitsu et al. |
| 5,867,335 A | 2/1999 | Ozue et al. |
| 5,867,736 A | 2/1999 | Jantz |
| 5,883,864 A | 3/1999 | Saliba et al. |

(Continued)

FOREIGN PATENT DOCUMENTS

| | | |
|---|---|---|
| EP | 0859308 | 6/1998 |
| EP | 0 859 308 | 8/1998 |

(Continued)

OTHER PUBLICATIONS

Foreign Search Report dated Feb. 13, 2003.

(Continued)

*Primary Examiner* — Joshua Joo (57) ABSTRACT

A method for providing data storage capacity on demand comprises disabling a set of slot elements and data transfer elements of a data library disallowing access to the disabled set by end users of the library, partitioning at least a portion of a set of active data media storage slot elements and active data transfer elements of the data library, exclusive of the disabled set, into partitions for use by the end users; and redefining the sets in response to changes in storage capacity rights of the end users.

23 Claims, 4 Drawing Sheets

(56) References Cited

U.S. PATENT DOCUMENTS

| | | | |
|---|---|---|---|
| 5,890,014 A | 3/1999 | Long | |
| 5,920,317 A | 7/1999 | McDonald | |
| 5,943,688 A | 8/1999 | Fisher et al. | |
| 5,970,030 A | 10/1999 | Dimitri | |
| 6,009,481 A | 12/1999 | Mayer | |
| 6,018,720 A | 1/2000 | Fujimoto | |
| 6,038,490 A | 3/2000 | Dimitri | |
| 6,044,442 A | 3/2000 | Jesionowski | |
| 6,052,341 A | 4/2000 | Bingham et al. | |
| 6,084,736 A | 7/2000 | Kurokawa et al. | |
| 6,085,123 A | 7/2000 | Baca | |
| 6,097,734 A | 8/2000 | Gotesman et al. | |
| 6,247,096 B1 | 6/2001 | Fisher et al. | |
| 6,260,120 B1 | 7/2001 | Blumenau et al. | |
| 6,295,578 B1 | 9/2001 | Dimitroff | |
| 6,328,766 B1 | 12/2001 | Long | |
| 6,335,927 B1 | 1/2002 | Elliott et al. | |
| 6,336,163 B1 | 1/2002 | Brewer et al. | |
| 6,336,172 B1 | 1/2002 | Day | |
| 6,370,545 B1* | 4/2002 | Shaath | 369/272.1 |
| 6,421,196 B1 | 7/2002 | Takayama et al. | |
| 6,421,711 B1 | 7/2002 | Blumenau | |
| 6,425,059 B1 | 7/2002 | Basham | |
| 6,446,141 B1 | 9/2002 | Nolan et al. | |
| 6,502,162 B2 | 12/2002 | Blumenau et al. | |
| 6,507,896 B2 | 1/2003 | Sanada | |
| 6,519,678 B1 | 2/2003 | Basham | |
| 6,532,197 B1 | 3/2003 | Cheung | |
| 6,535,964 B2 | 3/2003 | Sanada | |
| 6,574,667 B1 | 6/2003 | Blumenau et al. | |
| 6,606,664 B2* | 8/2003 | Darago et al. | 709/229 |
| 6,618,796 B2 | 9/2003 | Yamakawa et al. | |
| 6,633,954 B1 | 10/2003 | Don et al. | |
| 6,636,958 B2* | 10/2003 | Abboud et al. | 711/173 |
| 6,681,303 B1 | 1/2004 | Watanabe et al. | |
| 6,715,031 B2* | 3/2004 | Camble et al. | 711/111 |
| 6,725,394 B1 | 4/2004 | Bolt | |
| 6,731,625 B1 | 5/2004 | Eastep et al. | |
| 6,742,034 B1* | 5/2004 | Schubert et al. | 709/226 |
| 6,799,255 B1 | 9/2004 | Blumenau et al. | |
| 6,813,698 B2 | 11/2004 | Gallo et al. | |
| 6,823,398 B1 | 11/2004 | Lee et al. | |
| 6,832,272 B2 | 12/2004 | Hirakawa et al. | |
| 6,832,287 B2 | 12/2004 | Beeston et al. | |
| 6,839,804 B2 | 1/2005 | Don et al. | |
| 6,839,824 B2 | 1/2005 | Camble | |
| 6,842,784 B1 | 1/2005 | Black | |
| 6,845,431 B2 | 1/2005 | Camble | |
| 6,850,380 B2 | 2/2005 | Basham et al. | |
| 6,856,966 B1 | 2/2005 | Fujimoto | |
| 6,865,617 B2 | 3/2005 | Zeidner et al. | |
| 6,877,073 B2 | 4/2005 | Sanada et al. | |
| 6,999,999 B2* | 2/2006 | Camble et al. | 709/215 |
| 7,000,085 B2 | 2/2006 | Camble | |
| 7,062,614 B2 | 6/2006 | Camble | |
| 7,082,497 B2 | 7/2006 | Salter | |
| 7,363,425 B2 | 4/2008 | Camble | |
| 2001/0044877 A1 | 11/2001 | Kanazawa et al. | |
| 2002/0194294 A1 | 12/2002 | Blumenau et al. | |
| 2003/0065882 A1 | 4/2003 | Beeston et al. | |
| 2003/0126225 A1 | 7/2003 | Camble | |
| 2006/0095534 A1 | 5/2006 | Camble | |

FOREIGN PATENT DOCUMENTS

| | | |
|---|---|---|
| EP | 0859308 | 8/1998 |
| EP | 0 881 560 | 12/1998 |
| EP | 0 978 841 | 2/2000 |
| EP | 1 039 410 | 9/2000 |
| EP | 1 158 386 | 11/2001 |
| EP | 1156408 | 11/2001 |
| EP | 1158386 | 11/2001 |
| EP | 1158366 | 6/2006 |
| JP | 09185465 | 7/1997 |
| JP | 10269026 | 10/1998 |
| JP | 10-301819 | 11/1998 |
| JP | 11-045497 | 2/1999 |
| JP | 11-045509 | 2/1999 |
| JP | 11-086423 | 3/1999 |
| JP | 11-167768 | 6/1999 |
| JP | 2000-21090 | 1/2000 |
| JP | 10-228352 | 2/2000 |
| JP | 2000-67565 | 3/2000 |
| JP | 2000-067565 | 3/2000 |
| JP | 2000-268495 | 9/2000 |
| JP | 2001/014257 | 1/2001 |
| JP | 2001-014257 | 1/2001 |
| JP | 2001014257 | 1/2001 |
| JP | 2001-034422 | 2/2001 |
| JP | 2001-043598 | 2/2001 |
| JP | 2001/142648 | 5/2001 |
| JP | 2001-155410 | 6/2001 |
| JP | 2001-216710 | 8/2001 |
| JP | 2001-236718 | 8/2001 |
| JP | 2001-312374 | 11/2001 |
| JP | 2001-352322 | 12/2001 |
| JP | 2001-357610 | 12/2001 |
| JP | 2002304791 | 10/2002 |
| WO | WO-9934297 | 7/1999 |

OTHER PUBLICATIONS

IBM Technical Disclosure Bulletin, "Optical Disk Drive Loader for Work Station with Pluggable Magazine", vol. 38, No. 12, Dec. 1955, pp. 243-246.
IBM Technical Disclosure Bulletin, "Logical Grouping of Data Storage Media in a Library System", vol. 35, No. 5, Oct. 1992—pp. 17-20.
"Sharing Backup Resources,"Ralph Cuellar; Apr. 2000.
"The Gator Tape Library Family Architecture," John Kranz; Oct. 1999.
"Fibre Channel Fundamentals," Tom Weimer.
European Search Report issued for EP 02 25 8806, dated Jan. 4, 2005.
"Spectra 12000 User Guide," Sep. 2000.
EP Dec Refuse 02258775.2, Mar. 6, 2012, 24 pps.
EP Dec Refuse, 02258773.7, Dec. 11, 2012, 32 pps.
EP Dec Refuse, 02258808.1, Dec. 10, 2012, 23 pps.
EP Decision to Refuse a European Patent application, 02258807.3, Dec. 13, 2012, 17 pps.
EP OA4MO 02258773.7, Apr. 22, 2010, 6 pps.
EP OA4MO 02258775.2, Jun. 23, 2010, 6 pps.
EP OA4MO 02258777.8, Mar. 17, 2010, 5 pps.
EP OA4MO 02258778.6, Mar. 18, 2010, 4 pps.
EP OA4MO 02258789.3, May 20, 2009, 3 pps.
EP OA4MO 02258806.5, Apr. 1, 2011, 5 pps.
EP OA4MO, 02258764.6, Apr. 22, 2010, 6 pps.
EP OA4MO, 02258764.6, Jun. 8, 2011, 6 pps.
EP OA4MO, 02258773.7, May 31, 2011, 6 pps.
EP OA4MO, 02258808.1, May 31, 2011, 7 pps.
EP Search Report 02258806.5, Jan. 4, 2005, 4 pps.
EP Search Report, 02258764.6, Sep. 23, 2005, 4 pps.
EP search report, 02258773.7, Sep. 23, 2005, 4 pps.
EP Search Report, 02258808.1, Sep. 23, 2005, 3 pps.
EP SOP 02258773.7, Jul. 18, 2012, 10 pps.
EP SOP 02258775.2, Nov. 10, 2011, 7 pps.
EP SOP 02258777.8, Jul. 1, 2011, 8 pps.
EP SR 02258774.5, Sep. 23, 2005, 3 pps.
EP SR 02258775.2, Sep. 23, 2005, 4 pps.
EP SR 02258777.8, Sep. 16, 2005, 3 pps.
EP SR 02258778.6, Sep. 23, 2005, 3 pps.
EP SR 02258789.3, Jan. 5, 2005, 4 pps.
EP SR 02258807.3, Sep. 28, 2005, 3 pps.
EP Summons Oral Proceedings, 02258764.6, Jul. 18, 2012, 7 pps.
EP Summons to Oral Proceedings, 02258808.1, Jul. 18, 2012, 6 pps.
IBM Technical Disclosure Bulletin, Logical Grouping of Data Storage Media in a Library System, vol. 35, No. 5, Oct. 1992, pp. 17-20.
IBM Technical Disclosure Bulletin, Optical Disk Drive Loader for Work Station with Pluggable Magazine, vol. 38, No. 12, Dec. 1995, pp. 243-246.

(56) References Cited

OTHER PUBLICATIONS

JP 07-114501, Tajima, Shinichi, May 2, 1995, 8 pps.
JP 08-255472, Yamazaki, Etsuro, Oct. 1, 1996, 10 pps.
JP 2000-057662, Takayama, Yoshihisa, Feb. 25, 2000, 29 pps.
JP 2000-099272, Hino, Naoki et al., Storage Controller and Handling Method of Data Storage System Using Same, Apr. 7, 2000, 19 pps.
JP 2001-092601, Yokota, Masato et al., Information Recording and Reproducing Device and Method for Setting Its Occupancy, Apr. 6, 2001, 17 pps.
JP 2001-265655, Ito, Ryusuke, Sep. 28, 2001, 33 pps.
JP2000-339226, Dec. 8, 2000, 14 pps.
Massiglia, P., The RAID Book, 6th edition, Feb. 1997, 83 pps.
U.S. Appl. No. 10/034,518, Jul. 17, 2006, 14 pps.
US OA3MO U.S. Appl. No. 10/032,923, Apr. 10, 2007, 16 pps.
US OA3MO U.S. Appl. No. 10/032,923, Aug. 25, 2005, 13 pps.
US OA3MO U.S. Appl. No. 10/032,923, Mar. 7, 2005, 15 pps.
US OA3MO U.S. Appl. No. 10/034,083, Jun. 17, 2005, 20 pps.
US OA3MO U.S. Appl. No. 10/034,518, Jan. 31, 2006, 17 pps.
US OA3MO U.S. Appl. No. 10/034,518, Jul. 14, 2005, 26 pps.
US OA3MO U.S. Appl. No. 10/034,518, Oct. 13, 2006, 21 pps.
WO00/41063, Kuwayama, Noritada, Jul. 13, 2000, 26 pps.
Japanese Office Action for Application JP-2002-371826 (Partial English translation attached), dated Jul. 31, 2007, 8 ppgs.
European Search Report issued for EP 02 25 8778 dated Sep. 23, 2005.
European Search Report issued for EP 02 25 8807 dated Sep. 28, 2005.
Anonymous: "Veritas Volume Manager Administrator's Guide" Internet article, Online! Aug. 2001; XP 002340475; pp. 53-90; pp. 223-240.
U.S. Appl. No. 10/032,662, Non-Final Rejection dated Mar. 16, 2005 (14 pages).
U.S. Appl. No. 10/034,888, Non-Final Rejection dated Mar. 23, 2005 (10 pages).
U.S. Appl. No. 10/034,580, Non-Final Rejection dated May 22, 2003 (8 pages).
European Appl. No. 02258807.3, Communication Pursuant to Article 94(3) EPC dated Mar. 28, 2011 (7 pages).
European Appl. No. 02258807.3, Communication Pursuant to Article 94(3) EPC dated Mar. 18, 2010 (4 pages).
European Appl. No. 02258807.3, Summons to Attend Oral Proceedings to Rule 115(1) EPC dated Jul. 20, 2012 (7 pages).

* cited by examiner

METHOD FOR USING PARTITIONING TO PROVIDE CAPACITY ON DEMAND IN DATA LIBRARIES

RELATED APPLICATIONS

The present invention is related to the following and commonly assigned United States patent applications: entitled System and Method for Partitioning a Storage Area Network Associated Data Library, filed Dec. 28, 2001 and issued as U.S. Pat. No. 6,715,031 on Mar. 30, 2004; entitled System and Method for Partitioning A Storage Area Network Associated Data Library Employing Element Addresses, filed Dec. 28, 2001 and issued as U.S. Pat. No. 6,839,824 on Jan. 4, 2005; Ser. No. 10/032,662, entitled System and Method for Managing Access to Multiple Devices in a Partitioned Data Library, filed Dec. 28, 2001 and issued as U.S. Pat. No. 7,062,614 on Jun. 13, 2006; Ser. No. 10/032,923, entitled System and Method for Peripheral Device Virtual Functionality Overlay, filed Dec. 28, 2001 and published as U.S. Pub. No. 2003/0126225 on Jul. 3, 2003; Ser. No. 10/034,518, entitled System and Method for Securing Drive Access to Media based On Medium Identification Numbers, filed Dec. 28, 2001 and issued as U.S. Pat. No.7,363,425 on Apr. 22, 2008; Ser. No. 10/034,888, entitled System and Method for Securing Drive Access to Data Storage Media Based On Medium Identifiers, filed Dec. 28, 2001 and issued as U.S. Pat. No. 7,000,085 on Feb. 14, 2006; Ser. No. 10/033,010, entitled System and Method for Securing Fiber Channel Drive Access in a Partitioned Data Library, filed. Dec. 28, 2001 and issued as U.S. Pat. No. 6,999,999 on Feb. 14, 2006; entitled System and Method for Intermediating Communication with a Moveable Media Library Utilizing a Plurality of Partitions, filed Dec. 28, 2001 and issued as U.S. Pat. No. 6,845,431 on Jan. 18, 2005; and Ser. No. 10/034,083, entitled System and Method for Managing a Moveable Media Library with Library Partitions, filed Dec. 28, 2001 and issued as U.S. Pat. No. 7,082,497 on Jul. 25, 2006; the disclosures of which are hereby incorporated herein by reference.

TECHNICAL FIELD

The present invention generally relates to data storage and specifically to a system and method for using partitioning to provide capacity on demand in data libraries.

BACKGROUND

Many types of service providers (xSPs) may provide data storage for a large number of customers. There are advantages in terms of device management overhead to having a small number of large storage devices in a storage area network (SAN) and sharing those devices among a number of users. The management overhead associated with administering a large number of small storage devices, each assigned to different users of a SAN or the like is cost-prohibitive. Therefore, to reduce storage device management overhead, a storage service provider (SSP), or the like, may prefer to employ a small number of large disk arrays and securely allocate a portion of the disk array storage capacity to each customer rather than employ separate smaller storage devices for each customer. While instant capacity on demand (iCOD) exists for CPU power and disk storage, iCOD is not available for data libraries, particularly data tape libraries.

SUMMARY OF THE INVENTION

A method for providing data storage capacity on demand comprises disabling a set of slot elements and data transfer elements of a data library disallowing access to the disabled set by end users of the library, partitioning at least a portion of a set of active data media storage slot elements and active data transfer elements of the data library, exclusive of the disabled set, into partitions for use by the end users; and redefining the sets in response to changes in storage capacity rights of the end users.

One embodiment of a method implementing the present invention for providing data storage capacity on demand comprises reserving a set of data media storage slot elements and data transfer elements in a data library for present and future use by a customer, disabling a subset of the set of slot elements and data transfer elements, partitioning the reserved set into a subset of the set of slot elements and data transfer elements activated as a partition secured for use by the customer, wherein the subsets are exclusive of one another, and redefining the partition by moving at least one element between the subsets in response to changes in storage capacity needs of the customer Another embodiment of a method implementing the present invention for providing data storage capacity in a data library comprises disabling a set of slot elements and data transfer elements of the data library, disallowing access to the disabled set, partitioning at least a portion of a set of active slot elements and active data transfer elements of the data library into partitions for use by one customer, wherein the sets are exclusive of one another, and keying numbers of the elements in the partitioned set on a license purchased by the customer.

DETAILED DESCRIPTION

The present invention provides systems and methods offering variable capacity resources, to provide iCOD for data libraries, by leveraging aspects of resource partitioning. For customers needing to cope with fast data storage growth or unpredictable demand, a vendor may offer iCOD in accordance with the present invention. Need for instant capacity on demand for data libraries generally falls into two broad usage categories: first, to allow a SSP to provide extra capacity when requested, for example to increase the number of drives and/or slots available for use by a customer of the storage service provider when requested; a second category of need for iCOD may arise if a user purchases a data library and only initially wishes to use and pay the vendor for managing a subset of slots/drives that the user will actually use in the library. However, the user should be able to increase the number of drives and/or slots he may use in the library as needed. In either case, there is a need for some mechanism to enforce limiting the number of drives and/or slots in the tape library a customer can use, and for a convenient mechanism to alter this limit. Consistent with the above- and below-described usage scenarios, customers as discussed herein may include a third party, relative to an SSP, or an internal entity of an SSP. Additionally, the terms "customer" and "end user" are used interchangeably herein.

To reduce management and physical overhead, an SSP might prefer to use a library that can be securely partitioned similar to a disk array. For example, an SSP may wish to share a library among a number of users. Secure library partitioning enables such sharing. The customer or vendor may configure a number of partitions in the tape library, using fibre channel (FC) world wide name (WWN)-based security with each partition only accessible to one computer or co-operating subset of computers. Such a system and method of secured data library partitioning in disclosed in U.S. patent application Ser. No. 10/034,691 entitled "System And Method For Partitioning A Storage Area Network Associated Data Library". Secure library partitioning as shown and described in the above-referenced patent application enables an SSP to configure, preferably out-of-band on a private LAN using the library management card or library front panel, a number of secured partitions in a tape library well-suited for use by the present invention.

With library partitioning functionality, iCOD may be made available to end users of data libraries. Additionally or alternatively, a customer may pay to obtain use of a limited number of slots and drives in a tape library which may be physically located at a vendor site or on the customer's premises. Such limited access can be implemented by leveraging the aforementioned library partitioning system and method employing a license key mechanism to enforce the limits and allowing adjustments in the limits of the access according to changes in the license key.

As disclosed in the aforementioned co-pending application, a physical data library may be logically partitioned into many smaller virtual libraries, and each of the drives in the library designated for use by a different host system who has free access to the library robotics controller as well as the designated drives. Each of the drives or set of drives in the library are preferably assigned a limited range of media, such as data tapes, that each may access for read/write functions.

Figure 1:
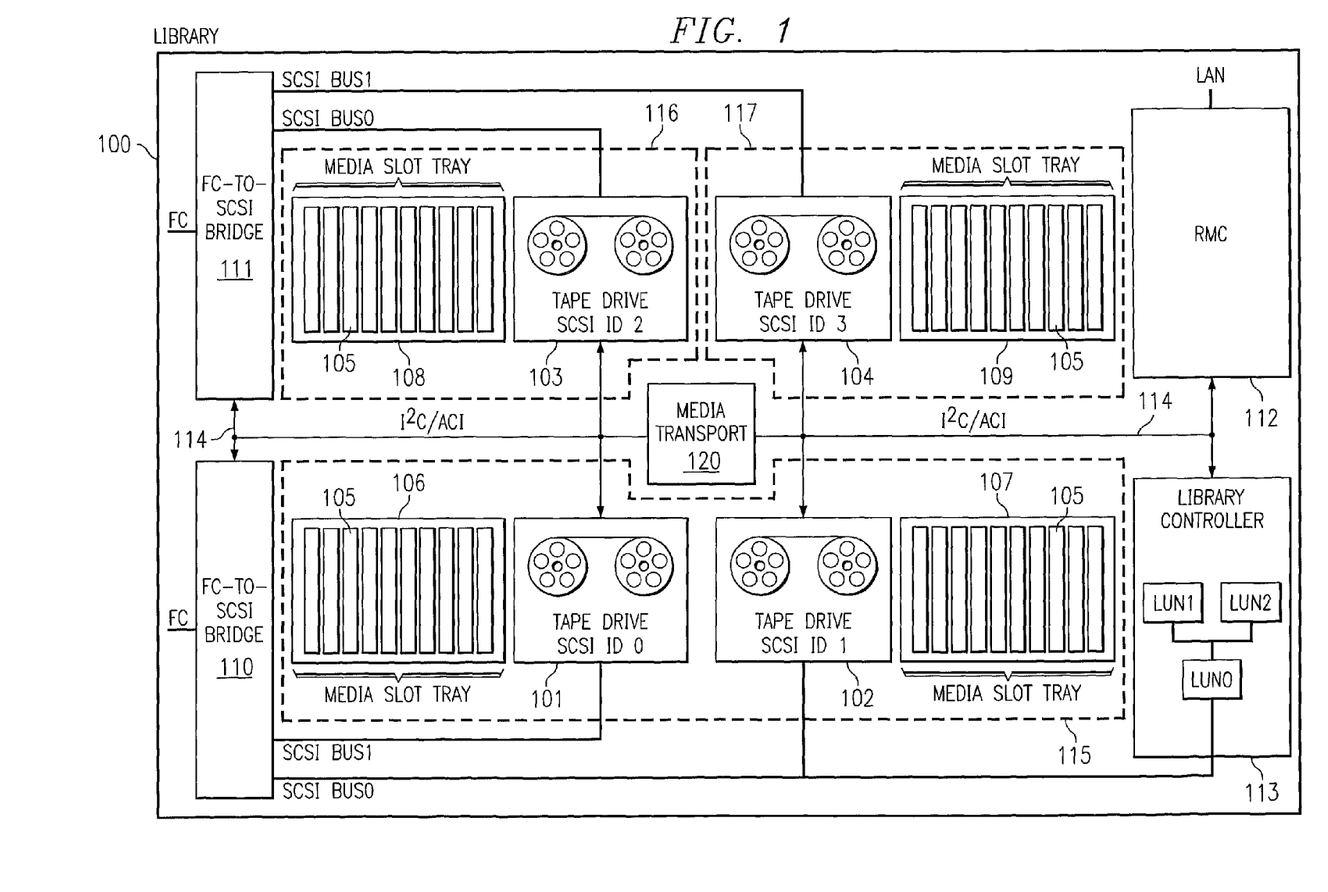
FIG. 1 is a diagrammatic illustration of an embodiment of a data library employing the present invention to provide instant capacity on demand.

Exemplar data library 100 employing a preferred embodiment of the present system and method is illustrated in FIG. 1. As one skilled in the art will appreciate, other data library partitioning methods may be employed to carry out the present invention. In the illustrated example, library 100 has four data transfer elements or drives 101-104; forty media storage slot elements 105, organized into four trays 106-109 of ten slots each; two fiber channel (FC)-to-small computer systems interface (SCSI) bridges 110 and 111; a library management interface card or remote management card (RMC) 112; and library controller 113. Drives 101-104, FC-to-SCSI bridges 110 and 111, RMC 112 and library controller 113 preferably communicate with each other using an inter-integrated circuit (I²C) bus and/or automated control interface (ACI) 114, or the like. For partitions employed by the present system and method, at least one drive should be assigned to each partition. Preferably, media slots 105 are also assigned to each partition to house the media assigned to the partition. A virtual library controller should be addressable with respect to each partition to control movement of media between the slots and drives by library robotics 120. The example partitioning shown in FIG. 1 is indicated by boxes 115, 116 and 117. As illustrated, LUN0 corresponds to partition 115, LUN1 corresponds to partition 116 and LUN2 corresponds to partition 117. Preferably, easily accessible media storage slots may be configured as mailslots or import/export elements. These may be assigned to each partition or configured for use by the entire physical library.

Figure 2:
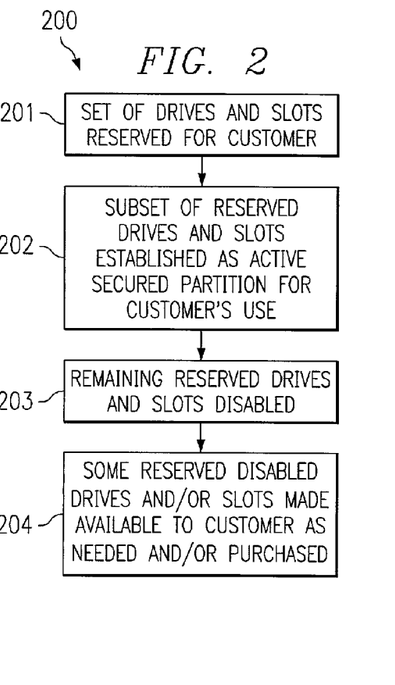
FIG. 2 is a flowchart of a first embodiment of the present invention.

Turning to FIG. 2, first method embodiment 200, preferably used to address the aforementioned first usage category, provides extra data library capacity on demand according to the present invention. In order to provide a fast response time to customer's changing backup and/or archiving requirements, an SSP can leverage the above-described secure partitioning capabilities for a data library to provide instant capacity on demand. Preferably, at box 201 an SSP or vendor sets aside a set of drives and slots for a customer, generally more than the customer initially requires. The customer may request and/or pay for a number of slots to be set aside, or reserved. Alternatively, the SSP or vendor may determine what of its resources it wishes to reserve for the future, potential use of the customer. Also, the SSP or vendor may set aside slots for its own internal use. In conformance with the partition method disclosed in the aforementioned secure library partitioning system and method, the slots and drives set aside are preferably contiguous in numbering so they can later be part of a single active partition. The customer should initially only use a subset of the slots and/or drives. At box 202, the subset to be used is established as an active partition secured to be only available to that customer or those designated by the customer. At box 203, the rest of the reserved drives and/or slots are preferably disabled and therefore unavailable for use by anyone. Preferably, the reservation is explicit. In other words, the SSP should ensure that these resources are kept disabled when not used by that customer and not accidentally assigned to another customer. Preferably, consistent with the aforementioned patent application Ser. No. 10/034,691, ventitled "System And Method For Partitioning A Storage Area Network Associated Data Library", such disabled slots are not allowed to be part of any partition. Preferably, the library controller will not accept a media move command to an element that is disabled. Similarly such elements are preferably not reported in response to a read element status command. Hence, a disabled drive can not be loaded with media, so reading from and writing to a disabled drive is not possible. Therefore, the disabled resources may not be used by backup software, or the like employed by the customers.

Figure 4A:
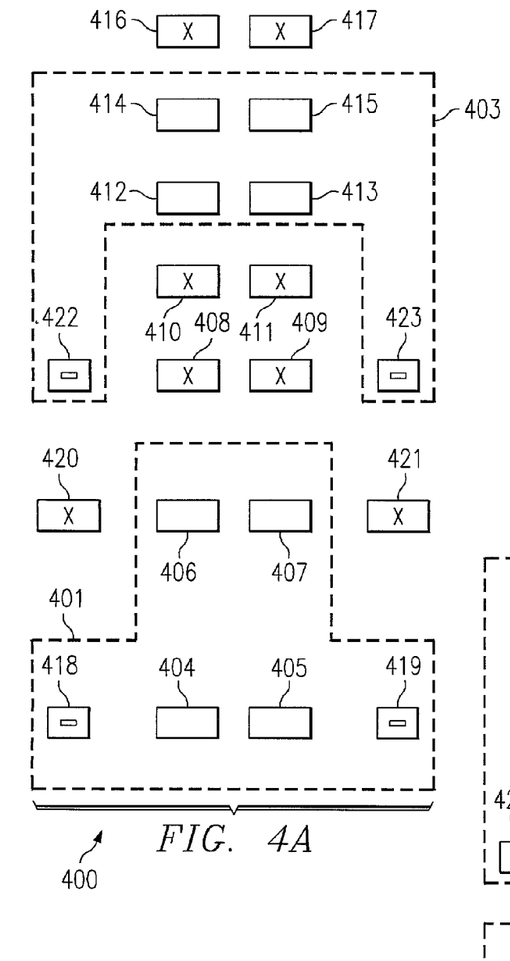
FIG. 4A is a diagrammatic illustration of a 160 slot, six-drive data library employing the embodiment discussed in connection with FIG. 2.

Turning attention to FIG. 4A, by way of example a six-drive and 140 slot (14 tray) library 400 used in accordance with the present invention is illustrated. In the illustrated example, a library owner such as an SSP, or the like, has reserved eighty slots and four drives, such as the slots of trays 404 through 411, and four drives for a customer, such as drives 418 through 421, in accordance with step 201 described above. However, the customer may only have a current need for forty slots and two drives. Therefore, in accordance with the present invention and step 202 above, the SSP may establish a set of forty slots, such as provided by trays 404 through 407, and two drives, such drives 418 and 419, as a partition, such as partition 401, for the use of the customer. This partition may be secured using FC WWN-based security to ensure only the aforementioned customer and his designates may access the partition as disclosed in copending, commonly-owned U.S. patent application Ser. No. 10/034,691 entitled "System And Method For Partitioning a Storage Area Network Associated Data Library. Preferably". The reserved drives and reserved slots, such as drives 420 and 421 and the slots of trays 408 through 411 are disabled to prevent anyone from accessing data using these drives or tapes from these slots. In such a case these disabled drives and disabled slots would not belong to any partition. The remaining slots and drives of library 400 may be partitioned and/or disabled as necessary, for example, drives 422 and 423 are shown as part of partition 403, along with the slots of trays 412 through 415, possibly for the use of another customer. The slots of trays 416 and 417 are shown as disabled, possibly reserved for the use of the second customer. Storage management software may be advantageously employed to aid in partition management.

Returning to FIG. 2, as the customer requires or desires more capacity, the SSP or vendor preferably makes some of the reserved disabled drives and/or media slots available to the customer by adding the required additional drives and/or slots to the customer's active partition at box 204, accordingly charging the customer. An SSP may have its own iCOD agreement with a library vendor that may operate similar to a second embodiment described below. In such a situation the SSP preferably only pays for library resources when the SSP's customers use or activate the resources.

Figure 4B:
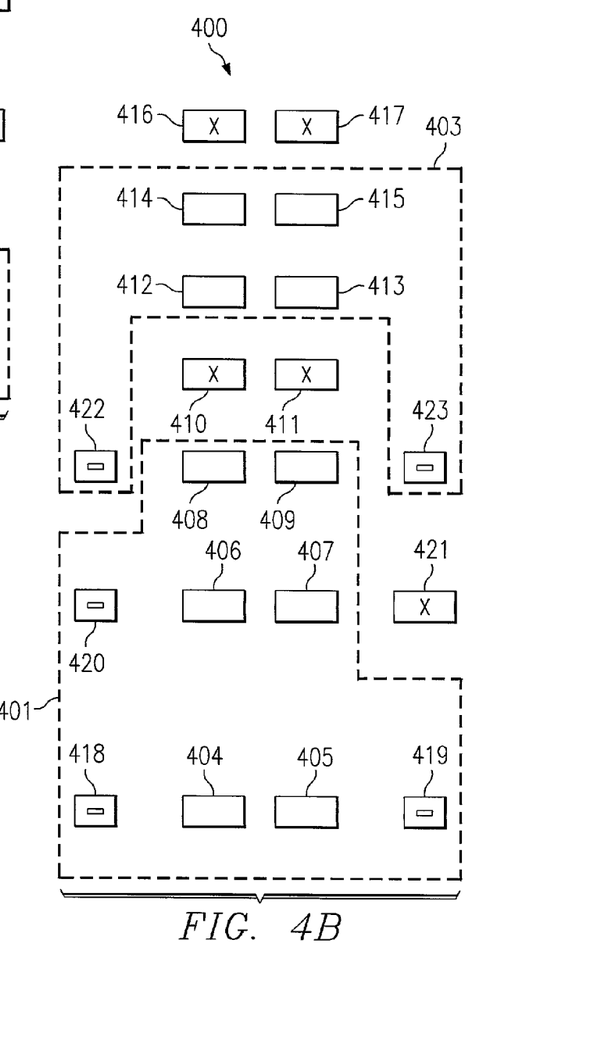
FIG. 4B is a diagrammatic illustration of the library of FIG. 4A in which a partition has been redefined in accordance with the present invention.

Turning to FIG. 4B partition 401 of FIG. 4A has been redefined to add reserved drive 420 and reserved trays 408 and 409 in accordance with step 204 described above. Reserved drive 421 and reserved trays 410 and 411 remain disabled, but reserved for the customer's future use.

Also in accordance with the present invention active storage capacity may be reduced and formerly active drives or slots may be disabled. These disabled drives and slots may remain reserved for use by the initial user or may become available for reservation or use by other users.

Figure 3:
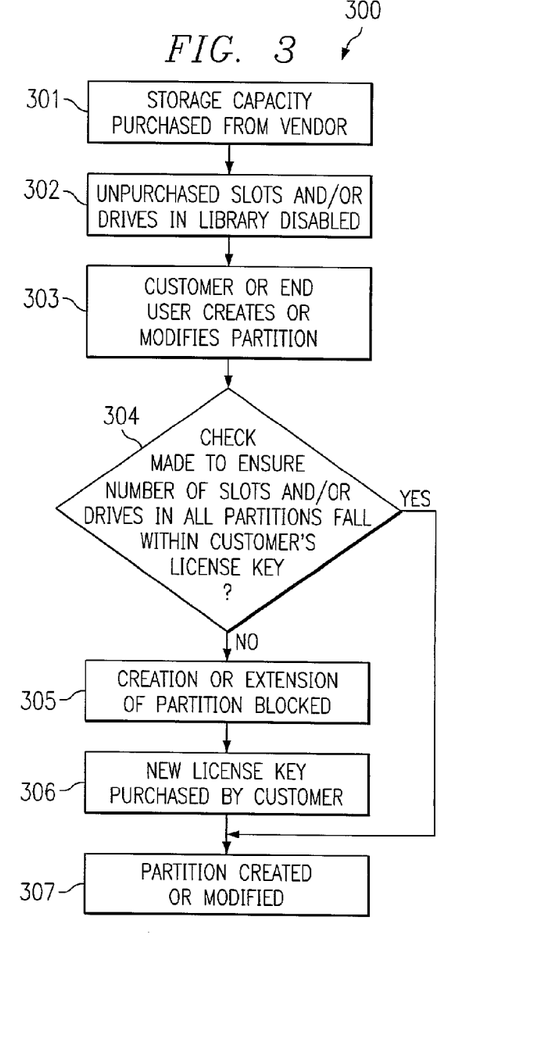
FIG. 3 is a flowchart of a second embodiment of the present invention.

Second method embodiment 300, illustrated in FIG. 3, may be used to address the second usage category discussed above. The second usage category is preferably for a customer to vendor relationship, wherein the customer has purchased a physical data library but initially only pays the vendor for use of a portion of the library's capacity, a subset of the library's slots and drives. The customer preferably has control of creating and/or resizing partitions of the library. Therefore, the library supplier or vendor needs a method of preventing the customer from using more capacity than the customer is paying for; a license key scheme is preferably used. In second method embodiment 300, the customer can be a xSP, for example, an SSP creating and extending partitions for its customers, the end users. In such a case, the SSP obtains and pays a vendor at box 301 for capacity to be used by the SSP's customers. Library slots or drives not yet paid for are disabled at box 302, and therefore, are not available for partitioning. Preferably, consistent with the aforementioned patent application Ser. No. 10/034,691, entitled "System And Method For Partitioning a Storage Area Network Associated Data Library", such disabled slots are not allowed to be part of any partition. Preferably, the library controller will not accept a media move command to an element that is disabled. Similarly such elements are preferably not reported in response to a read element status command. Hence, a disabled drive can not be loaded with media, so reading from and writing to a disabled drive is not possible. Therefore, the disabled resources may not be used by backup software, or the like employed by the customers or end users.

Figure 5A:
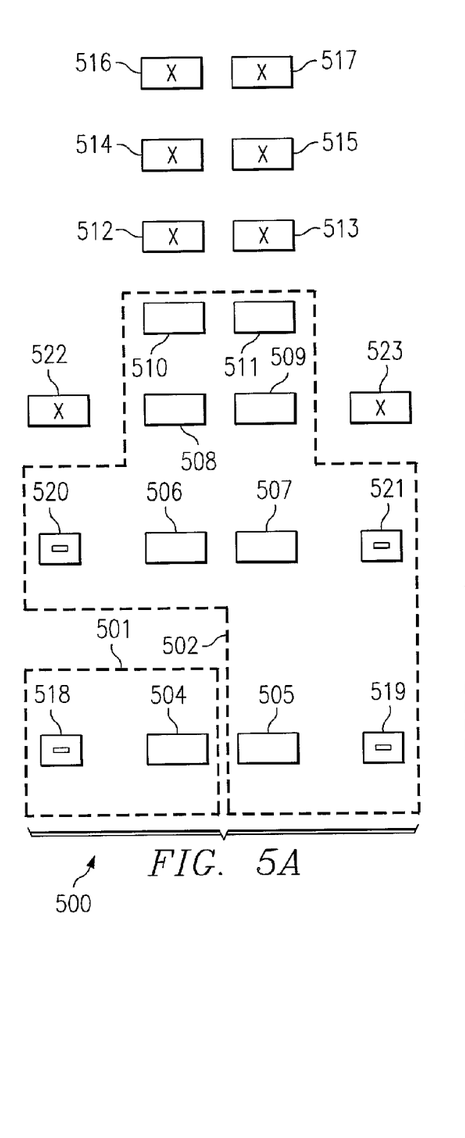
FIG. 5A is a diagrammatic illustration of a 160 slot, six-drive data library employing the embodiment discussed in connection with FIG. 3.

With attention directed to FIG. 5A, exemplar library 500 employing the present system and method may be located at a customer's premises and partitioned by the customer for use by the customer's users or customers. In FIG. 5A, the customer or library owner has paid for a license to use drives 518 through 521 and the slots of trays 504 through 511. The remaining drives 522 and 523 and slots of remaining trays 512 through 517 have been disabled. The licensed portion of library 500 has been partitioned in FIG. 5A for the use of customers of the SSP. Example partition 501 includes one drive, 518 and one tray 304 of slots. Second example partition 502 includes 3 drives 519, 520 and 521 and 5 trays of slots 505 through 511.

Returning to FIG. 3, each time a library partition is created or extended, box 303, the management card, preferably RMC 112 of FIG. 1, checks at 304 to make sure that the number of drives and slots used in all the partitions of the library is not greater than the license key allows. If at 304 it is found that a creation or extension of a partition results in the total used library capacity exceeding the license key, the creation or extension is blocked at box 305 until the customer obtains, and pays for a new license key at box 306. Obtaining and paying for a new key or increased license rights may be accomplished in several manners, as determined by the vendor. For example, a key purchase may be manually made by the customer phoning or emailing for a new key; or the key purchase process could be automatic, for example, the library itself could automatically phone the vendor for a new key. Similarly, payment could be made or arranged for in advance, for example by providing credit card details, or billed to an account for later payment. If at decision box 304, creation or extension of a library falls within the paid capacity of the customer's license key or licensed capacity is extended at box 306, the partition is created or modified at box 307 in accordance with the secure partitioning system and method employed by the library.

Figure 5B:
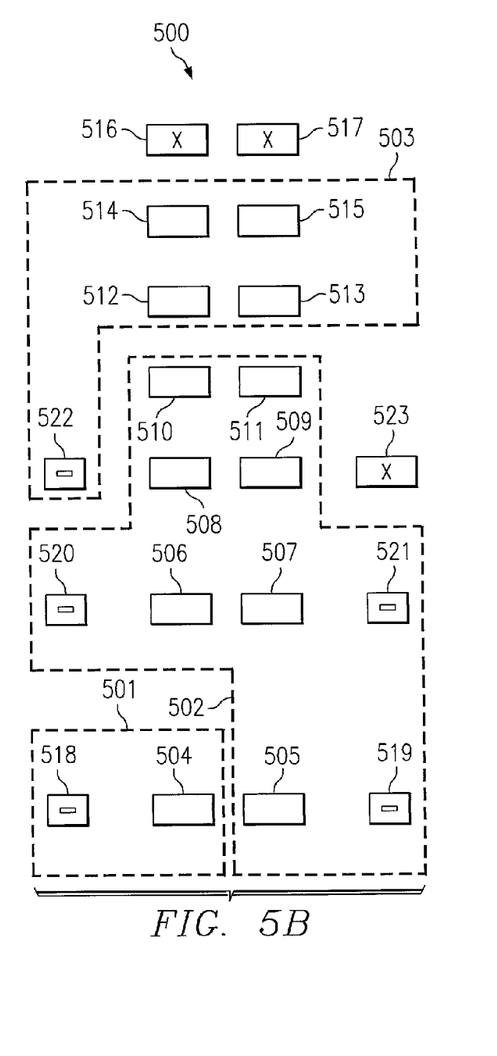
FIG. 5B is a diagrammatic illustration of the library of FIG. 5A in which a partition has been added in accordance with the present invention.

In FIG. 5B new partition 503, including the slots of trays 512 through 515 and drives 522 have been established for use by a customer. To establish partition 503 the SSP had sufficient license rights at box 304 or purchased additional license rights at box 307 to make use of slots of trays 512 through 515 and drive 522. In FIG. 5B, slots of trays 516 and 517 and drive 523 remain disabled. This may be as a result of the SSP not having a license for use of the library capacity of this slot and drive or it may be as a result of the slots and drive not being assigned to a partition although licensed by the SSP.

Embodiment 300 preferably enables reducing active drives and slots in a partition as described above in relation to embodiment 200. In accordance with such a reduction the present invention may alternatively, enable a customer may to downgrade their license key, getting money back or reducing future license fees. Additionally, an alternative embodiment enables a license to be transferable. Another alternative embodiment calls for a license key to be tied to a specific library, for example, to the media access control (MAC) address of an Ethernet port on the RMC.

What is claimed is:

1. A method for providing data storage capacity on demand comprising;
   disabling a set of slot elements and data transfer elements of a data library disallowing access to said disabled set by end users of said library, wherein the disabled set is explicit and the disabled set is not allowed to he part of any partition and is unavailable for use by anyone;
   partitioning at least a portion of a set of active data media storage slot elements and active data transfer elements of said data library, exclusive of said disabled set, into partitions for use by said end users; and
   redefining said partitions in response to changes in storage capacity rights of said end users.

2. The method of claim 1 further comprising reserving at least a portion of said disabled set of data media storage slot elements and data transfer elements for present and future use by one of said end users.

3. The method of claim 1 wherein said redefining step further comprises moving at least one element of said active set to said disabled set in response to an order from one of said end users for additional storage capacity.

4. The method of claim 1 wherein said redefining step comprises:
   moving at least one element of said active set to said disabled set in response to an order from said one end user for additional storage capacity and availability of said elements.

5. The method of claim 4 wherein said availability is based at least in part on a license by one of said end users.

6. The method of claim 5 further comprising blocking said redefining step in response to said license lacking sufficient rights for said redefining.

7. The method of claim 5 further comprising extending licensed library capacity.

8. The method of claim 1 wherein said data library is physically located on a premises of one of said end users.

9. The method of claim 1 wherein a library controller does not accept a media move command to an element in the disabled set.

10. The method of claim 1 wherein elements in the disabled set are not reported in response to a read element status command.

11. The method of claim 1 wherein a disabled drive cannot be loaded with media, and wherein reading from and writing to a disabled drive is not possible.

12. The method of claim 1 further comprising each time a library partition is created or extended, checking to ensure that a number of drives and slots in all of the library partitions of the library is not eater than a license key allows.

13. A method for providing data storage capacity on demand comprising:
   reserving a set of data media storage slot elements and data transfer elements in a data library for present and future use by a customer;
   disabling a subset of said set of slot elements and data transfer elements, wherein the disabled subset is not allowed to he part of any partition and is unavailable for use by anyone;
   partitioning said reserved set into a subset of said set of slot elements and data transfer elements activated as a partition secured for use by said customer, wherein said disabled subset and said partitioned subset are exclusive of one another; and
   redefining said partition by moving at least one element between said disabled subset and said partitioned subset in response to changes in storage capacity needs of said customer.

14. The method of claim 13 further comprising:
   adjusting customer charges according to said redefining.

15. The method of claim 13 wherein said library is controlled by a storage service provider.

16. The method of claim 13 wherein said customer is a customer of said storage service provider.

17. A method for limiting access to data storage capacity in a data library, said method comprising:
   disabling a set of slot elements and data transfer elements of said data library, wherein the disabled set is not allowed to be part of any partition and is unavailable for use by anyone;
   partitioning at least a portion of a set of active slot elements and active data transfer elements of said data library into partitions for use by one customer, wherein said active set and said disabled set are exclusive of one another; and
   keying numbers of said elements in said partitioned set on a license purchased by said customer.

18. The method of claim 17 further comprising redefining said partitioned set by moving at least one element between said active set and said disabled set in response to a change in storage capacity needs of said customer and availability of said elements.

19. The method of claim 18 wherein said availability is based at least in part on a license by said customer.

20. The method of claim 19 further comprising blocking said redefining in response to said license lacking sufficient rights for said redefining.

21. The method of claim 19 further comprising increasing said license.

22. The method of claim 17 wherein said data library is physically located on a premises of said customer.

23. The method of claim 17 wherein said customer is a storage service provider.

* * * * *

UNITED STATES PATENT AND TRADEMARK OFFICE
CERTIFICATE OF CORRECTION

PATENT NO. : 8,788,611 B2  Page 1 of 1
APPLICATION NO. : 10/033003
DATED : July 22, 2014
INVENTOR(S) : Peter Thomas Camble et al.

It is certified that error appears in the above-identified patent and that said Letters Patent is hereby corrected as shown below:

In the Specification

Column 1, line 23, delete "No.7,363,425" and insert -- No. 7,363,425 --, therefor.

In the Claims

Column 6, line 56, in Claim 1, delete "comprising;" and insert -- comprising: --, therefor.

Column 6, line 60, in Claim 1, delete "he" and insert -- be --, therefor.

Column 7, line 36, in Claim 12, delete "eater" and insert -- greater --, therefor.

Column 7, line 44, in Claim 13, delete "he" and insert -- be --, therefor.

Signed and Sealed this
Ninth Day of December, 2014

Michelle K. Lee
*Deputy Director of the United States Patent and Trademark Office*